United States Patent [19]

Ishida et al.

[11] 4,156,481
[45] May 29, 1979

[54] FRICTION CLUTCH FOR AUTOMOTIVE VEHICLES

[75] Inventors: Nobuyasu Ishida, Tokai; Hisao Murase, Toyota, both of Japan

[73] Assignee: Aisin Seiki Kabushiki Kaisha, Kariya, Japan

[21] Appl. No.: 802,590

[22] Filed: Jun. 1, 1977

[30] Foreign Application Priority Data

Jun. 3, 1976 [JP] Japan ............................. 51-72262[U]

[51] Int. Cl.² ........................ F16D 3/14; F16D 47/02; F16D 69/00
[52] U.S. Cl. ............................. 192/106.1; 64/27 R
[58] Field of Search .................... 64/27 R; 192/106.1

[56] References Cited

U.S. PATENT DOCUMENTS

| 1,611,558 | 12/1926 | Reed | 192/106.1 |
| 2,964,930 | 12/1960 | Aira et al. | 192/106.1 X |
| 3,386,265 | 6/1968 | Kasaback | 192/106.1 X |

FOREIGN PATENT DOCUMENTS 46-30215  1971  Japan ................................. 192/106.1

Primary Examiner—Benjamin W. Wyche
Assistant Examiner—James Yates
Attorney, Agent, or Firm—Burns, Doane, Swecker & Mathis

[57] ABSTRACT

A friction clutch comprising a driving and driven members to be operatively connected with or disconnected from each other by being axially pressed to or separated from each other, respectively.

Both members are coupled through elastic damper means in engagement of the clutch to thereby provide cushioning service when the clutch is being engaged against an impulsive torque applied to the driven member particularly by a heavier weight of vehicles.

4 Claims, 7 Drawing Figures

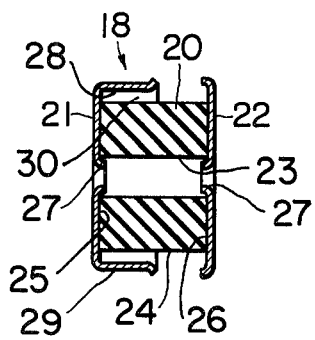
FIG. 3a
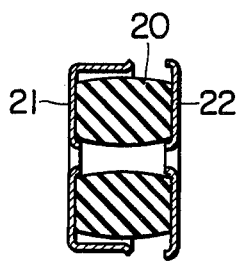
FIG. 3b
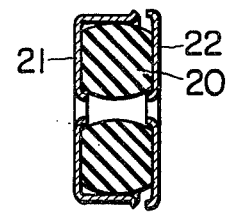
FIG. 3c
FIG. 4
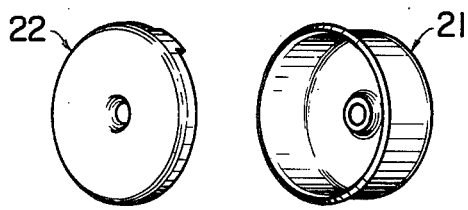
FIG. 5
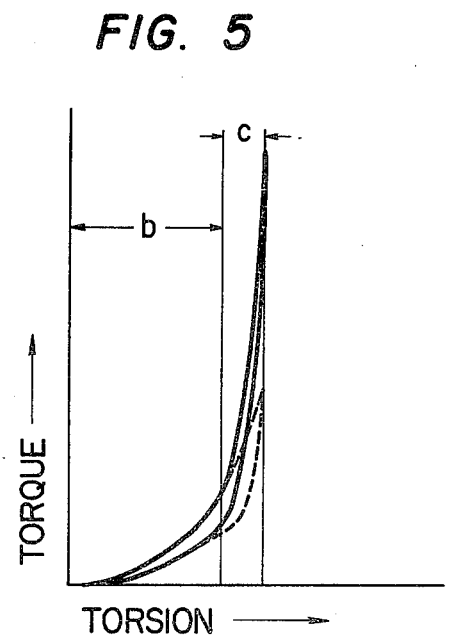

FRICTION CLUTCH FOR AUTOMOTIVE VEHICLES

BACKGROUND OF THE INVENTION

This invention relates to a friction clutch adapted to automotive vehicle, and more particularly to such clutch having driving and driven members to be frictionally connected with or disconnected from each other by being axially displaced relative to each other for frictional engagement, damper means for cushioning torque applied from the driving member to the driven member with a torsion developed between the driving and driven members when the clutch is being engaged, and stopper means to firmly couple the driving and driven members in order to enable the torque to be applied to the fullest extent to the driven member causing the damper means stand inactive.

In the type of clutch, the damper means must provide better cushioning of the torque applied to the driven member in order to start or accelerate the automotive vehicle smoothly with rapidity. With light vehicles or slow starting or acceleration of vehicles, the problem is relatively simple, but the difficulties multiply as weight and speed are increased.

None of the conventional clutches of such type, however have proven to be entirely sufficient with the class of service above mentioned i.e., when the clutch is being engaged, the damper means is apt to be early deformed or to early yield to its fullest extent by the torque even though the torque is not yet increased to one large enough to meet the requirement for driving the vehicle. This drawback is considered to be a defect in that, the stopper means and the hub member come to impulsively collide with each other almost every time the clutch is being engaged and repeating the collisions results in ruin of them. The repeated collisions may be attributed to the elastic characteristics of the damper means which does not strictly meet complex requirement of the cushioning of the torque applied to the driven member. In short, the damper means of rubber material and other similar elastic material tends to lack rigidity at a later stage during the cushioning operation when the clutch is being engaged.

SUMMARY OF THE INVENTION

Principal object of the invention is therefore to provide an improved friction clutch enabled to obtain the desired cushioning ability of the damper means to decrease occasions of collision between driving and driven members at the stopper means.

The foregoing object and others are attained according to at least one aspect of the invention through provision of means for constraining yielding property of the damper means to a predetermined one particularly at a later stage during cushioning operation of the damper means when the clutch is being engaged.

Thus in the embodiment, there are comprised a flywheel to be a counterpressure disc, a cover fastened to the flywheel to rotate with the flywheel, a pressure plate disposed in the space between the flywheel and the cover to axially move but not to rotate relative to the cover for forming a driving member of the clutch, a rotatable entrainment disc mounted on a rotatable shaft to form a driven member of the clutch, the entrainment disc including a clutch hub splined to the rotatable shaft and at least one plate member fitted to slide on the hub and disposed between the flywheel and the pressure plate to be clamped at the outer region by the flywheel and the pressure plate in engagement of the clutch, damper means anchored at one end to the hub and at the other end to the plate member to permit a torsion between the hub and the plate member due to yielding character of the damper means while perform cushioning operation of the torque, and at least one retainer means of receptacle form to nest at least a portion of the damper means for constraining yielding property of the damper means to a predetermined one to thereby provide a way for readily calculating cushioning ability in design of the clutch.

BRIEF DESCRIPTION OF THE DRAWING

FIGS. 3(a) to 3(c) are axial sectional views of the damper means of the clutch showing successive orders of magnitude of deformation under compression by a torque applied to the clutch when the clutch is being engaged;

FIG. 4 is a perspective view of retainers of the damper means exploded; and

FIG. 5 is a graphical representation showing relationship between torsion and torque both developed when the clutch is being engaged.

DESCRIPTION OF THE PREFERRED EMBODIMENT

Figure 1:
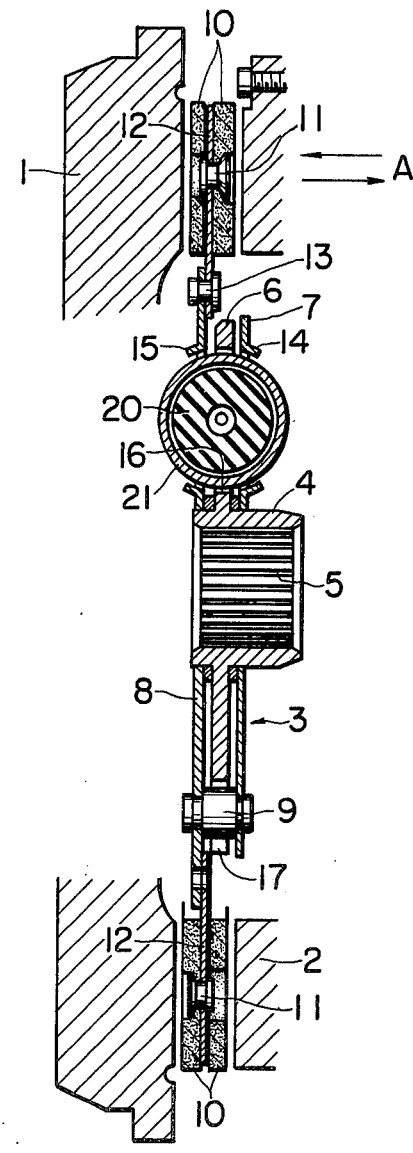
FIG. 1 is a cross sectional view of one embodiment of the friction clutch according to the invention taken along the line I—I in FIG. 2.
Figure 2:
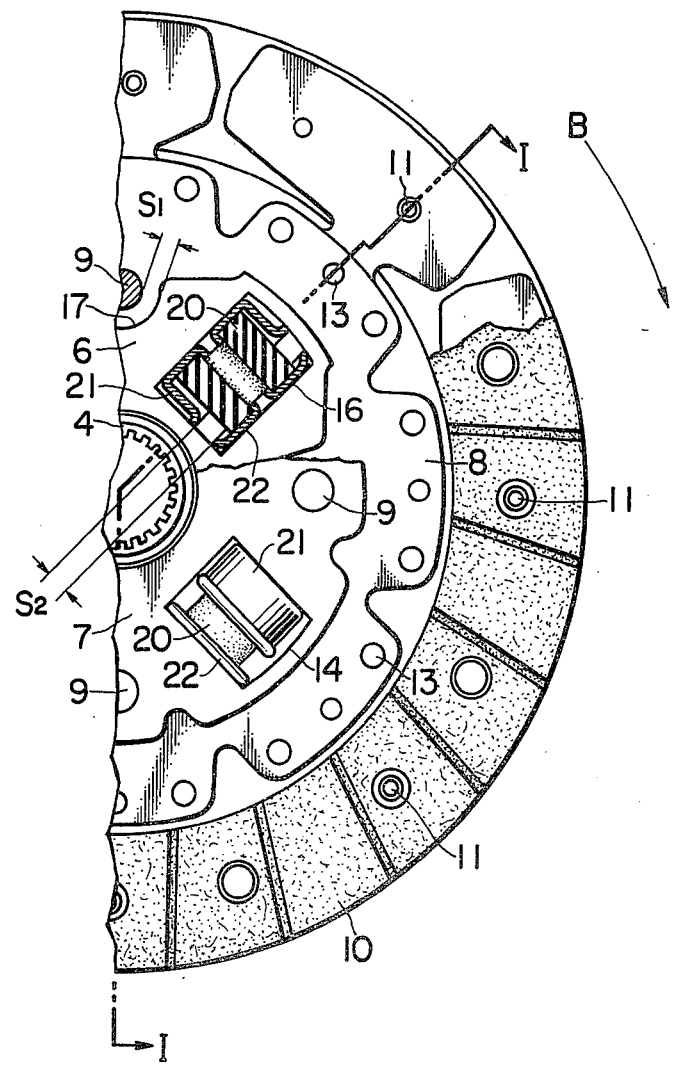
FIG. 2 is a plain view of the clutch partly broken away.

Referring now to the drawings and first particularly to FIGS. 1 and 2 thereof, there is shown a friction clutch according to the invention, having a flywheel 1 in the form of a counter-pressing disc. A cover (not shown) is secured by means of screws to the flywheel as a unit, and a pressure plate 2 is connected through leaf spring elements (not shown) of the known type by means of revets to this cover. The pressure plate 2 is axially displaceable as shown by the arrow A by a clutch plate spring (not shown) commonly called diaphragm spring toward the counter pressure disc 1 and an entrainer disc 3 rotatably splined on a non-illustrated shaft of the known transmission of a vehicle. In the position shown in FIG. 1, the clutch is in disengaged condition. To engage the clutch, the shift ring (not shown) is caused to release the clutch plate spring by a non-illustrated shift mechanism so that the outer region 10, usually referred to as clutch facing, of the entrainer disc 3 is clamped between the flywheel 1 and the pressure plate 2. A torque is therefore transmitted from the flywheel through the clutch disc or entrainer disc 3 to the non-illustrated shaft of the transmission.

The parts of the clutch mentioned above have only been briefly described, since they are of types currently in use or conventional.

The clutch disc or entrainer disc 3 is formed of a pair of circular plates 7 and 8 between which is interposed a flange 6 in spaced relation with the plates. The plates 7 and 8 are connected to each other as a unit by means of rivets 9 to rotate together, whereas the flange 6 is connected resiliently to the plates through dampers 20 of rubber or other elastic material which will be further described in greater detail hereinbelow. The flange 6 has a hub 4 which is in splined connection with the non-illustrated shaft of the transmission as indicated by the numeral 5, in FIG. 1. The outer region of the plate 8 is provided with a number of arcuate segmental plates 12 fastened by means of rivets 13. All the plates 12 are sandwitched between a pair of clutch facings 10 by means of rivets 11 so as to form a friction clutch with the plates 7 and 8. As partly shown in FIG. 2, all the rivets 9 are located within arcuately elongated recesses 17 of the flange 6 so that play is provided between the rivets 9 and the edge of the recess 17. The play permits the plates 7 and 8 to rotate relative to the flange 6 through an angle which is proportional to the order of magnitude of the play itself. The rivets 9 serve as stopper means to constrain rotation of the plates 7 and 8 relative to the flange 6 to an angular rotation predetermined by the play. The play is designated by the reference character S1 in FIG. 2 at the middle top.

The plates 7 and 8 have respectively windows 14 and 15 strictly in accord with each other in number and location and further in circumferential size. The flange 6 has also windows 16 also identical with the windows 14 and 15 in number, location and circumferential size so that a circumferentially encircling series of triple windows are formed by the windows 14, 15 and 16 around the central hub 4 at regular intervals (only two of the triple windows are shown in FIG. 2). A rubber damper 20 of a shape somewhat like a spool closely suits each of the triple windows. Since the windows 14 and 15 are of radially smaller size than the diameter of each damper 20, each damper 20 is nested within the triple window in falling-off-free condition when assembled in unitary construction with the plates 7 and 8 and flange 6.

Each damper 20 is anchored at both ends to the opposite edges of the triple windows through retainers 21 and 22. The retainer 22 is of flat and circular form and merely serves to retain the damper end whereas the other retainer 21 is of somewhat receptacle like form to nest about half of entire volume of the damper 20 in pressure-free condition, with an annular clearance around the damper. This clearance is very important to obtain the desired result of the invention as will be explained as the discussion proceeds.

The damper includes a central bore 23, a cylindrical external face 24, and a pair of end faces 25, 26. The retainer members are located at the end faces and include central projections 27 extending with close fit into opposite ends of the bore 23 to support the damper so that the external face 24 is spaced inwardly of an inner face 28 of a flange portion 29 of the retainer member 21. The flange portion 29 is arranged concentrically relative to the bore 23. The clearance 30 formed between the faces 24, 28 enables the damper 20 to expand without resistance transversely outwardly under compression during a first stage of the compression period until the damper face 24 contacts the retainer face 28. At that point further outward expansion of the damper is resisted by the flange portion 29 (FIG. 3c). That is, the ability of the damper to further expand during a subsequent stage of the compression period is lessened.

When the clutch is engaged, the pressure plate 2 is displaced toward the flywheel 1 so as to clamp the clutch facings 10 between the flywheel and the pressure plate 2. The torque from the flywheel 1 is transmitted through entrainment disc 3, damper 20, hub 4 and spline 5 to the non-illustrated shaft of the transmission. In detail, the torque applied to the facings 10 causes the plates 7 and 8 together to rotate, for example in the direction of arrow B in FIG. 2. The input first compresses the rubber dampers 20 and a torsion is developed between the plates 7 and 8 and the flange 6, in porportion to the order of magnitude of a resistance of the driven member usually originated from dead rest of the vehicle. During the compression period, the dampers perform cushioning operation of the torque applied to the plates 7 and 8, due to its elastic energy stored therein.

When the damper 20 is compressed for cushioning of the torque, the damper diametrically expands and until the retainer 21 comes to be filled with the expanding damper to utmost capacity the expansion continues to provide the cushioning of the torque. When the retainer 21 comes to be full up with the damper, the retainer 21 thereafter affects yielding property of the damper and accordingly cushioning of the torque. Such affection will be seen in the graphical representation in FIG. 5 with assistance of illustration in FIG. 3. In from FIGS. 3(a) to 3(c), three successive steps of diametrical expansion of damper 20 is shown. FIG. 3(a) shows that the damper 20 is relieved of torque, FIG. 3(b) shows that the damper is compressed under pressure due to the torque but a clearance still exists between the damper and the retainer, and FIG. 3(c) shows that the retainer 21 is full up with the expanding damper so that damper is restrained from free expansion and relationship between the torque and the torsion is altered thereby as will be apparent from the illustration in FIG. 5.

In FIG. 5, the curved solid line shows relationship between the torque and the torsion due to that torque applied to the clutch according to the invention while the other dotted curved line shows similar relationship of a clutch currently in use. Within the range of torsion designated by the reference character "b", the damper 20 does not fill the retainer 21 to utmost capacity thereof as shown in FIG. 3(b) while within the range of torsion maked "c" the damper comes to fill the retainer to utmost capacity, and available torque increases at a higher rate as compared with the otherwise permissible torque shown in dotted line as the conventional one.

Assuming that all the rivets 9 abut against the edges of their corresponding recesses 17 when the increasing torsion reaches the righthand end of the range "c", the clutch according to the invention is beneficially bearable against a higher level torque before such abutment happens. It may be concluded that the clutch of the invention has an ability to decrease occasions on which the rivets 9 abut against the recesses 17 and in turn to prevent the rivets and recesses from being impaired by impulsive abutment due to heavier torque application as is usual with clutches used in heavy trucks.

In FIG. 5, it will be understood that the hysteresis cycle of the solid and dotted lines will result from engaging and disengaging the clutch due to the property of the rubber material forming the damper.

While the embodiment of the retainers 21 and 22 as herein described constitutes a preferred form, it is to be understood that other forms, such as for example, a form in which both retainers are of receptacle-like shape may be adopted. Further, by selecting the depth of the receptacle like retainer, any curvature of the line showing the relationship between torque may be obtained.

It should be noted that the clearance S1 (FIG. 2) must be so calculated in design that a residue of another clearnce S2 still exists between both retainers 21 and 22 at the time rivets 9 abut against the edges of recess 17 in engagement of the clutch.

What is claimed is:

1. A friction clutch comprising a flywheel, a pressure plate axially movable but not rotatable relative to the flywheel to form a driving member of the clutch as a unit, a rotatable entrainment disc mounted on a rotatable shaft to form a driven member of the clutch, the entrainment disc including a clutch hub splined to the rotatable shaft and at least one plate member fitted to slide on the hub and disposed between the flywheel and the pressure plate to be clamped at the outer region by the flywheel and the pressure plate in engagement of the clutch, at least one damper means of elastic material anchored at one end to the hub and at the other end to the plate member to permit a torsion to be developed between the hub and the plate member in accordance with the elastic characteristic of the damper means, the damper means including a cylindrical external face, a through-bore concentric to the external face, and a pair of end faces surrounding opposite ends of the bore; a pair of retainer members located, respectively, at said end faces, each retainer member including a central projection extending with close fit into the bore to support the damper means, at least one of the retainer members having an outer flange portion concentric with the central projection, the flange portion including an internal face of larger diameter than the diameter of the external face of the damper means in an uncompressed state to form an annular clearance of uniform radial thickness therebetween, said clearance maintained by support of said damper means by said central projections; the clearance being sufficiently large to allow the damper means when compressed to expand without resistance traversely of the direction of compression during a first stage of the compression period, the clearance being small enough that the external face of the damper means contacts the internal face of the flange portion to resist further outward expansion of the damper means and lessen the ability of the damper means to further expand during a subsequent stage of the compression period, said retainer members being disposed in non-contacting relationship during the entire compression period.

2. A friction clutch according to claim 1 wherein the hub has a flange extending radially in parallel with the plate member and a series of windows in the flange circularly arranged around the hub; the plate member has also a series of windows identical in number and location with the windows of the flange to form a series of aligned pairs of windows; and a set of the damper means are provided in identical number and in identical location with the windows of the flange and the plate member, the damper means being formed of rubber material; and each damper means together with its retainer members being contained within one of the aligned pairs of windows whereby all the damper means are compressed by the flange and the plate member when the clutch is being engaged.

3. A friction clutch according to claim 2 wherein a sub plate member is further provided in parallel and spaced relation with the other plate member and the flange is disposed between the said other plate member and the sub plate member, the sub plate member being fastened to the said other plate member to rotate as a unit and having a series of windows identical in number, location and circumferential size with the windows of the said other plate member to thereby form in assembly a series of circularly arranged sets of three aligned windows by said both plate members and the flange, each damper means being contained within one of the sets of three aligned windows whereby said damper means is compressed between the flange at one end and said both plate members at the other end when the clutch is being engaged.

4. A friction clutch according to claim 3 wherein each damper means is retained at one end by the retainer member having the flange portion and at the other end by a retainer having no flange portion.

* * * * *